Figure 1:
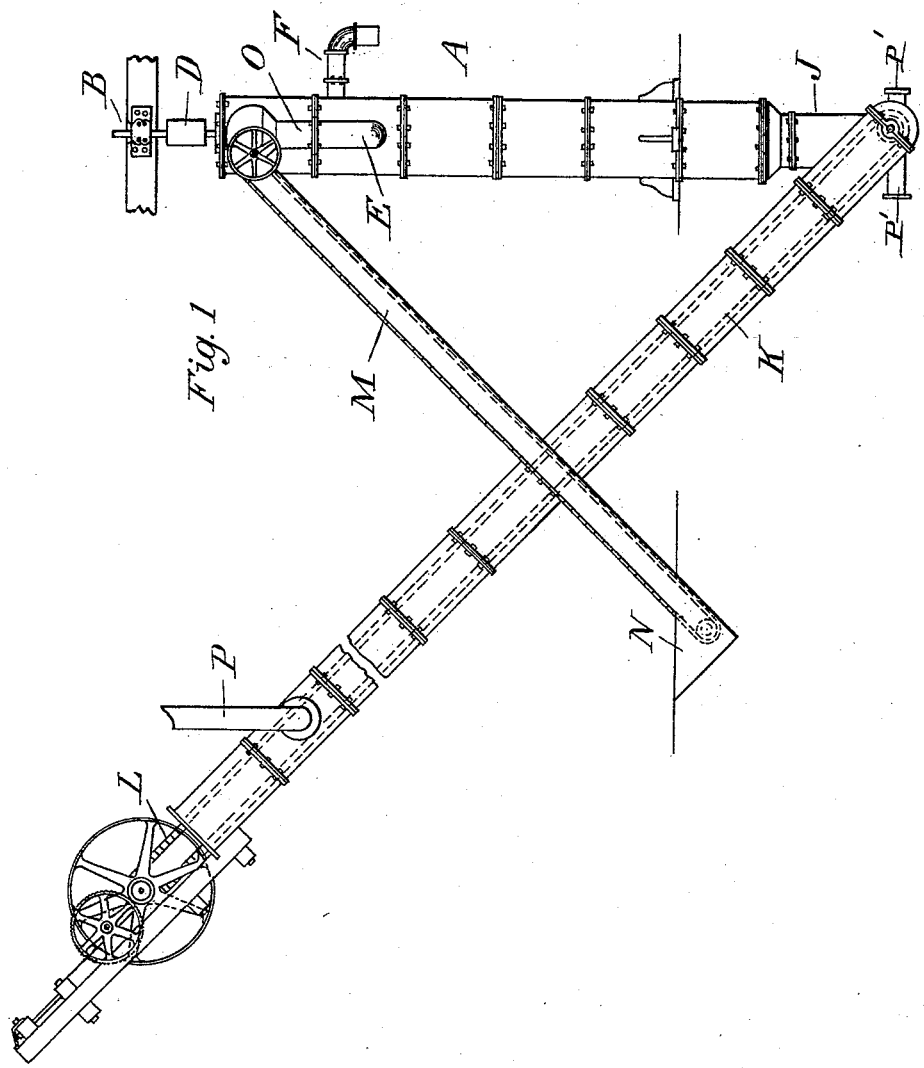

(No Model.) 2 Sheets—Sheet 1.

T. CRANEY.
APPARATUS FOR WASHING SALT.

No. 496,866. Patented May 9, 1893.

Witnesses:
N. L. Lindop
Otto F. Barthel

Inventor:
Thomas Craney
By Thos. Sprague & Son
Attys.

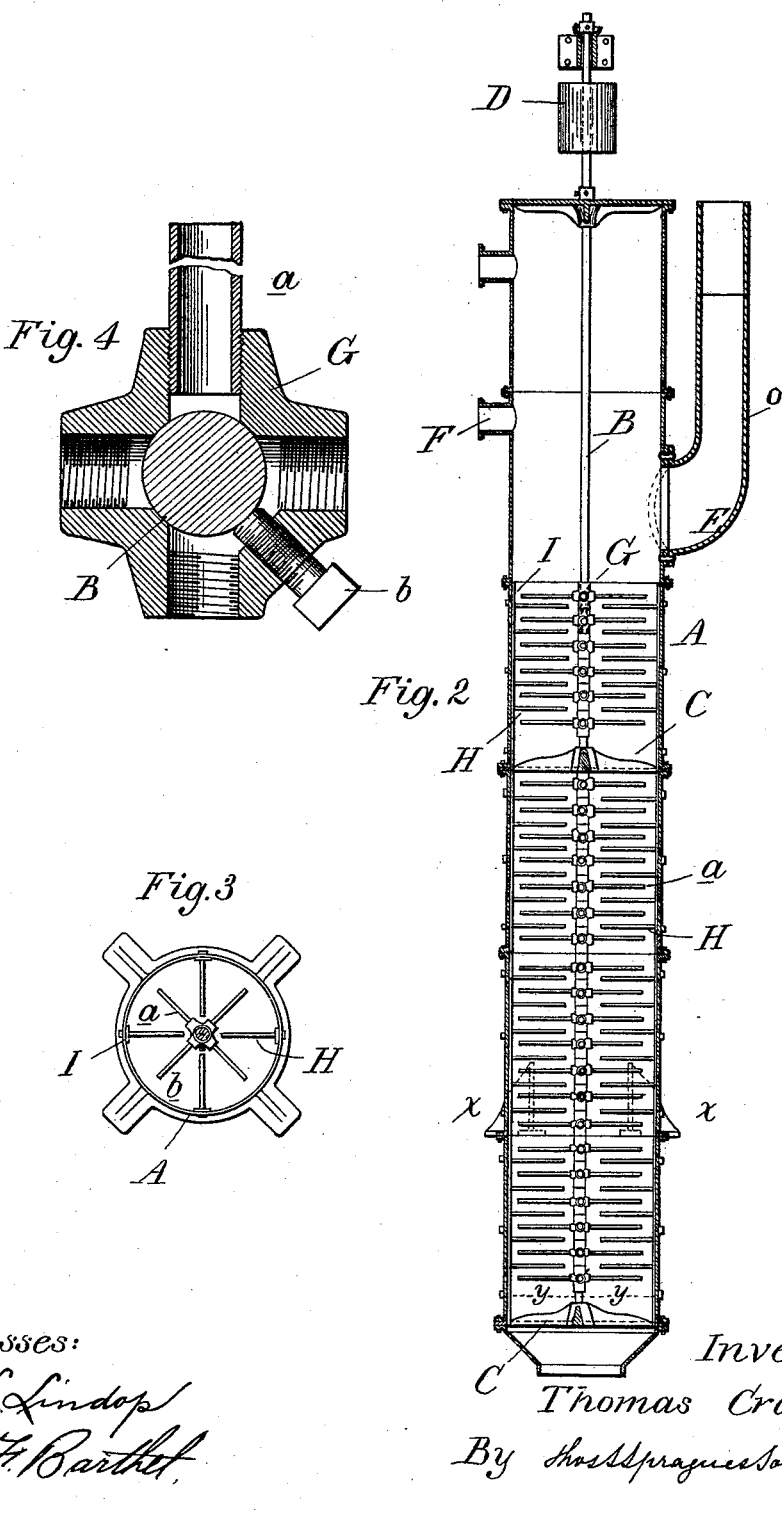

UNITED STATES PATENT OFFICE.

THOMAS CRANEY, OF BAY CITY, MICHIGAN.

APPARATUS FOR WASHING SALT.

SPECIFICATION forming part of Letters Patent No. 496,866, dated May 9, 1893.

Application filed September 2, 1892. Serial No. 444,914. (No model.)

*To all whom it may concern:*

Be it known that I, THOMAS CRANEY, a citizen of the United States, residing at Bay City, in the county of Bay and State of Michigan, have invented certain new and useful Improvements in Salt-Purifiers, of which the following is a specification, reference being had therein to the accompanying drawings.

This invention relates more particularly to an apparatus for purifying common salt; and the object of my invention is to produce chemically pure salt by purifying the common salt as produced by the known processes and sold in the market. This salt contains often from two to five per cent. of impurities which are made up generally of different chlorides, soluble in water, such as chloride of calcium and chloride of magnesium and insoluble substances, such as earthy matter contained in the brine from which the salt has been manufactured or foreign substances which have become admixed incidentally in the course of manufacture.

To this end I have designed an apparatus in which I subject the salt to a mechanical treatment which is generally sufficient to remove all the impurities commonly found in salt and by means of which I have succeeded at a slight expense in making salt almost chemically pure. At the same time my apparatus enables me to make a fine grade of market salt from the large amount of waste salt which owing to coloring matter and other foreign impurities is of low grade and applicable only to commercial or agricultural uses.

My apparatus is based upon the fact that the impurities found in common salt are not contained in the salt crystals but adhere only mechanically to the surfaces of the crystal and may be removed by a process of washing accompanied by mechanical agitation and separation by gravity, all as more fully hereinafter described in connection with the accompanying drawings, in which—

Figure 1 is an elevation of my apparatus embodying my invention. Fig. 2 is a vertical central section through the purifying tank, showing the devices for agitating. Fig. 3 is a horizontal section on line $x$—$x$ in Fig. 2. Fig. 4 is an enlarged horizontal section on line $y$—$y$ in Fig. 2.

A is the stand pipe preferably constructed of iron in a number of superimposed sections bolted together to form a tight vessel for containing liquid.

B is the revolving shaft journaled in the axis of the vessel, which to this end is provided with suitable cross-trees C at necessary intervals to form suitable bearings therefor, the lower one of such crosstrees having a suitable step in which the shaft is supported. On the upper end of this shaft outside the vessel are applied means for revolving the shaft, such as the pulley D. On one side below the top of the vessel, the inlet opening E is provided, through which the salt to be purified is introduced, and some distance above this inlet opening the overflow outlet F is located, which overflow outlet is intended to keep the liquid in the vessel to the height thereto. To the shaft B is secured the vertical series of agitators preferably formed of radially arranged arms secured to a hub G, one of these hubs being shown in detail in Fig. 4, in which $a$ are the arms and $b$ a set screw for holding the hub upon the shaft. Between the arms of the revolving agitators are secured stationary arms H which project from the wall of the vessel toward the center and which arms preferably in number and form correspond with the arms of the agitator and are secured at equal distances apart to vertical ribs I, formed or secured on the inside of the vessel. At the bottom, this vessel communicates with a vertical trunk J which is preferably of less diameter than the vessel and which communicates at its bottom with the lower end of the inclined conveyer pipe K. This inclined conveyer pipe extends from the bottom of the trunk J to some distance above the level of the liquid in the vessel and contains a carrier or conveyer for removing the salt from the bottom of the trunk. To this end I preferably employ an endless bucket chain L passing around suitable sprocket wheels, to the upper one of which power is conveyed in any suitable manner, and which is also provided with means for tightening the bucket chain. A similar bucket chain is arranged in the inversely inclined trunk or carrier flue M to convey the salt from the place of delivery N to the top of the inlet pipe O from which it is allowed to fall through said inlet pipe and opening E at the bottom thereof into the vessel. This bucket chain is also provided with suitable means for conveying power to it.

P is a pipe for conveying brine or other washing solution into the trunk K from a suitable source of supply.

In practice, the parts being arranged and constructed substantially as shown and described, the mode of operation is intended to be as follows: I preferably use for the washing solution common salt brine such as is procured from the wells and this I introduce through the pipe P, preferably by a continuous feed. The course of flow is then down through the trunk K and through the communication at the bottom thereof into the trunk J from whence it flows in an upward direction through the stand-pipe and overflows through the opening F into a receiver. At the same time the salt to be treated is carried by the conveyer from the place of delivery at N into the top of the pipe O from which it falls into the top of the vessel where it becomes suspended in the brine which is contained therein to a distance above that opening. By its specific gravity the salt is then compelled to gravitate toward the bottom of the vessel, but during such passage it is caught up by the agitating device and given a thorough treatment of washing during its descent to the bottom of the vessel. The agitators produce an intimate mixing of the salt crystals with the washing liquid, which is thereby enabled to dissolve or absorb the soluble matter adhering to the salt crystals and also hold the earthy matter or other admixtures thoroughly in suspension, and as the direction of the washing fluid is in the direction opposite to the course of the gravitating salt they will become separated and carried by the flow to the top of the vessel and out through the discharge pipe, while the salt freed from its foreign substance finally drops into the bottom of the vessel and is carried out by the conveyer during which time it is acted on by the contrary flow of the washing liquid down through the trunk K. By the time it is brought to the surface of the washing liquid it has practically all the impurities eliminated and a superior grade of salt is obtained.

While I have described no other washing liquid but brine I want it distinctly understood that I do not intend to confine myself thereto, as the kind of liquid best adapted depends conditionally upon the impurities which may be contained in the salt and therefore the use of certain chemicals embodied in the washing liquid is within the spirit of my invention.

It will be obvious that the washing liquid overflowing from the vessel need not be wasted, but after suitable treatment may be used anew.

The vessel is provided at the bottom with suitable discharge openings P' for the purpose of cleaning or washing out the vessel when necessary.

What I claim as my invention is—

1. In an apparatus for purifying salt, the combination of a vessel adapted to contain a body of washing fluid, and provided with an overflow, a supply pipe for the washing fluid communicating with the vessel for maintaining a supply of fresh washing fluid and circulating the same upwardly through the vessel, mechanical feed devices for feeding the salt into the top of the vessel, mechanical devices for removing the salt from the bottom of the vessel, and a stirring device in the vessel, substantially as described.

2. In an apparatus for purifying salt the combination of the vessel adapted to contain a body of the washing fluid, an overflow for the same near the top of the vessel, a settling chamber at the bottom of the vessel, an inclined trunk communicating with said settling chamber and extending above the level of the fluid in the vessel, a conveyer in said trunk for removing the salt from the settling chamber, a feed connection for the washing fluid into said vessel, means for feeding the salt into the top of the vessel and an agitator submerged in the body of the washing fluid in the vessel, substantially as described.

3. In an apparatus for purifying salt, the combination of the cylindrical vessel, the agitator having arms secured to a revolving shaft and intermediate fixed arms secured to the walls of the vessel, the settling chamber J at the bottom of the vessel, the inclined conveyer trunk K communicating therewith and containing the conveyer L, the inlet P into said conveyer trunk for the washing fluid, the overflow F from the vessel, and the feed for introducing the salt into the top of the vessel, all arranged to operate substantially as described.

In testimony whereof I affix my signature in presence of two witnesses.

THOMAS CRANEY.

Witnesses:
M. B. O'DOGHERTY,
N. L. LINDOP.